US006590738B2

United States Patent
Kim

(10) Patent No.: US 6,590,738 B2
(45) Date of Patent: Jul. 8, 2003

(54) PARTICLE REMOVAL DEVICE IN A HARD DISK DRIVE

(75) Inventor: Seonghoon Kim, Cupertino, CA (US)

(73) Assignee: Samsung Electronics Co., Ltd. (KR)

( * ) Notice: Subject to any disclaimer, the term of this patent is extended or adjusted under 35 U.S.C. 154(b) by 238 days.

(21) Appl. No.: 09/797,781

(22) Filed: Mar. 1, 2001

(65) Prior Publication Data

US 2002/0122272 A1 Sep. 5, 2002

(51) Int. Cl.⁷ .................................................. G11B 33/14
(52) U.S. Cl. ...................................................... 360/97.02
(58) Field of Search ........................... 360/97.01–97.04, 360/98.01, 99.01, 137

(56) References Cited

U.S. PATENT DOCUMENTS

| 3,558,831 A | 1/1971 | Prescott et al. |
| 4,110,802 A | 8/1978 | Ho et al. |
| 4,280,156 A | 7/1981 | Villette |
| 4,493,554 A | 1/1985 | Pryor et al. |
| 4,555,739 A | 11/1985 | Le Van et al. |
| 4,562,500 A | 12/1985 | Bygdnes |
| 4,630,926 A | 12/1986 | Tanaka et al. |
| 4,661,873 A | 4/1987 | Schulze |
| 4,673,996 A | 6/1987 | White |
| 4,703,376 A | 10/1987 | Edwards et al. |
| 4,731,777 A | 3/1988 | Yoshitoshi et al. |
| 4,739,425 A | 4/1988 | Dierkes et al. |
| 4,784,012 A | 11/1988 | Marra |
| 4,794,588 A | 12/1988 | Yoshitoshi et al. |
| 4,802,042 A | 1/1989 | Strom |
| 4,819,105 A | 4/1989 | Edwards |
| 4,839,756 A | 6/1989 | Chew et al. |
| 4,866,553 A | 9/1989 | Kubo et al. |
| 4,870,519 A | 9/1989 | White |
| 4,890,172 A | 12/1989 | Watt et al. |
| 4,949,206 A | 8/1990 | Phillips et al. |
| 4,958,337 A | 9/1990 | Yamanaka et al. |
| 4,982,300 A | 1/1991 | Forbord |
| 4,996,614 A * | 2/1991 | Okutsu ..................... 360/236.4 |
| 5,004,207 A | 4/1991 | Ishikawa et al. |
| 5,021,905 A | 6/1991 | Sleger |
| 5,029,026 A | 7/1991 | Stefansky et al. |
| 5,062,017 A | 10/1991 | Strom et al. |
| 5,097,370 A | 3/1992 | Hsia |
| 5,128,822 A | 7/1992 | Chapin et al. |

(List continued on next page.)

FOREIGN PATENT DOCUMENTS

| EP | 0 426 353 A2 | 5/1991 |
| EP | 0 463 752 A2 | 1/1992 |
| EP | 0 491 563 A2 | 6/1992 |
| EP | 0 582 464 A2 | 2/1994 |
| EP | 0 801 387 A2 | 10/1997 |
| FR | 2518-791 A | 6/1983 |
| GB | 2 050 670 A | 1/1981 |
| GB | 2 100052 A | 12/1982 |
| GB | 2 326 755 A | 12/1998 |
| JP | 632 344 55 | 9/1988 |
| JP | 3-83281 | 4/1991 |
| JP | 3-104079 | 5/1991 |
| JP | 09251769 A | 9/1997 |
| JP | 9-293370 | 11/1997 |
| JP | 11-306731 A * | 11/1999 |
| WO | WO 93/10494 | 5/1993 |
| WO | WO 96/34390 | 10/1996 |

OTHER PUBLICATIONS

US 6,091,569, 7/2000, Allsup et al. (withdrawn)

*Primary Examiner*—Jefferson Evans
(74) *Attorney, Agent, or Firm*—Irell & Manella, LLP; Jeffrey P. Aiello

(57) ABSTRACT

A vortex generator that extends from an inner surface of a housing. The vortex generator cooperates with an air flow generated by a rotating disk of the disk drive to create vortices. The vortices can remove contaminants located on the surface of a disk.

12 Claims, 2 Drawing Sheets

U.S. PATENT DOCUMENTS

| | | |
|---|---|---|
| 5,130,870 A | 7/1992 | Jabbari |
| 5,159,508 A | 10/1992 | Grill et al. |
| 5,161,900 A | 11/1992 | Bougathou et al. |
| 5,167,167 A | 12/1992 | Tiernan, Jr. et al. |
| 5,175,661 A | 12/1992 | Mizuno et al. |
| 5,187,621 A | 2/1993 | Tacklind |
| 5,200,868 A | 4/1993 | Chapin et al. |
| 5,202,803 A | 4/1993 | Albrecht et al. |
| 5,214,549 A | 5/1993 | Baker et al. |
| 5,241,438 A | 8/1993 | Matsushima |
| 5,243,495 A | 9/1993 | Read et al. |
| 5,247,493 A | 9/1993 | Kime et al. |
| 5,262,911 A | 11/1993 | Cain et al. |
| 5,262,913 A | 11/1993 | Stram et al. |
| 5,267,109 A | 11/1993 | Chapin et al. |
| 5,274,519 A | 12/1993 | Saito et al. |
| 5,287,235 A | 2/1994 | Cunningham et al. |
| 5,293,282 A | 3/1994 | Squires et al. |
| 5,309,303 A | 5/1994 | Hsia et al. |
| 5,319,511 A | 6/1994 | Lin |
| 5,343,343 A | 8/1994 | Chapin |
| 5,347,414 A | 9/1994 | Kano |
| 5,365,389 A | 11/1994 | Jabbari et al. |
| 5,369,538 A | 11/1994 | Moe et al. |
| 5,396,386 A | 3/1995 | Bolasna et al. |
| 5,396,387 A | 3/1995 | Murray |
| 5,402,290 A | 3/1995 | Daniel |
| 5,404,256 A | 4/1995 | White |
| 5,410,402 A | 4/1995 | Li et al. |
| 5,422,776 A | 6/1995 | Thorson et al. |
| 5,426,562 A | 6/1995 | Morehouse et al. |
| 5,442,638 A | 8/1995 | Awad et al. |
| 5,455,728 A | 10/1995 | Edwards et al. |
| 5,460,017 A | 10/1995 | Taylor |
| 5,463,527 A | 10/1995 | Hager et al. |
| 5,469,311 A | 11/1995 | Nishida et al. |
| 5,537,272 A | 7/1996 | Kazmierczak et al. |
| 5,546,250 A | 8/1996 | Diel |
| 5,555,144 A | 9/1996 | Wood et al. |
| 5,570,249 A | 10/1996 | Aoyagi et al. |
| 5,610,776 A | 3/1997 | Oh |
| 5,636,090 A | 6/1997 | Boigenzahn et al. |
| 5,663,853 A | 9/1997 | Park |
| 5,673,158 A | 9/1997 | Ichimura |
| 5,677,813 A | 10/1997 | Yoshida et al. |
| 5,703,734 A | 12/1997 | Berberich et al. |
| 5,754,353 A | 5/1998 | Behrens et al. |
| 5,768,249 A | 6/1998 | Ro et al. |
| 5,781,373 A | 7/1998 | Larson et al. |
| 5,801,899 A | 9/1998 | Genheimer |
| 5,815,349 A | 9/1998 | Frater |
| 5,822,139 A | 10/1998 | Ayabe |
| 5,831,795 A | 11/1998 | Ma et al. |
| 5,844,754 A | 12/1998 | Stefansky et al. |
| 5,844,911 A | 12/1998 | Schadegg et al. |
| 5,875,067 A | 2/1999 | Morris et al. |
| 5,885,005 A | 3/1999 | Nakano et al. |
| 5,886,851 A | 3/1999 | Yamazaki et al. |
| 5,901,017 A | 5/1999 | Sano et al. |
| 5,926,347 A | 7/1999 | Kouhei et al. |
| 5,930,079 A | 7/1999 | Vera et al. |
| 5,930,080 A | 7/1999 | Frater et al. |
| 5,936,927 A | 8/1999 | Soga et al. |
| 5,969,901 A | 10/1999 | Eckberg et al. |
| 5,987,733 A | 11/1999 | Goss |
| 6,011,670 A | 1/2000 | Balsley, Jr. et al. |
| 6,034,941 A | 3/2000 | Ro |
| 6,046,883 A | 4/2000 | Miller |
| 6,084,744 A | 7/2000 | Genheimer et al. |
| 6,088,192 A | 7/2000 | Riener et al. |
| 6,088,194 A | 7/2000 | Imaino et al. |
| 6,088,202 A | 7/2000 | Kabasawa et al. |
| 6,104,571 A * | 8/2000 | Kabasawa ................ 360/236.4 |
| 6,154,360 A | 11/2000 | Kaczeus, Sr. et al. |
| 6,157,522 A | 12/2000 | Murphy et al. |
| 6,166,901 A | 12/2000 | Gamble et al. |
| 6,185,075 B1 | 2/2001 | Tsujino et al. |
| 6,185,807 B1 | 2/2001 | Kazmierczak et al. |
| 6,198,606 B1 | 3/2001 | Boutaghou et al. |
| 6,201,668 B1 | 3/2001 | Murphy |
| 6,205,005 B1 | 3/2001 | Heath |
| 6,226,143 B1 | 5/2001 | Stefanksy |
| 6,226,152 B1 | 5/2001 | Tanaka et al. |
| 6,229,668 B1 | 5/2001 | Huynh et al. |
| 6,233,124 B1 | 5/2001 | Budde et al. |
| 6,239,943 B1 | 5/2001 | Jennings et al. |
| 6,366,432 B1 * | 4/2002 | Tadepalli et al. ........... 360/266 |

* cited by examiner

PARTICLE REMOVAL DEVICE IN A HARD DISK DRIVE

BACKGROUND OF THE INVENTION

1. Field of the Invention

The present invention relates to a vortex generator integrated into a housing of a hard disk drive.

2. Background Information

Hard disk drives typically contain a plurality of hard disks that are rotated by a spindle motor. The hard disks spin relative to a plurality of heads. The heads can magnetize or sense the magnetic fields of the disk surfaces to store and retrieve binary information as is well known in the art. Each head typically has a write element to magnetize the disk and a separate read element to sense the magnetic field of the disk. The read element is typically constructed from a magneto-resistive material that linearly varies with changing magnetic flux. This type of head is commonly referred to as a MR head.

Each head is typically gimbal mounted to a suspension arm. A head and suspension arm are commonly referred to as a head gimbal assembly (HGA). The suspension arms are attached to an actuator arm that can pivot about a base plate of the drive. The actuator arm has a voice coil that is connected to a drive circuit (not shown) and coupled to a magnet assembly. The voice coil and magnet assembly are commonly referred to as a voice coil motor. The drive circuit provides a current which excites the voice coil motor and causes the actuator arm to rotate about the base plate. Rotation of the actuator arm moves the heads relative to the surfaces of the disks. Data is typically stored on the disk within annular tracks. Movement of the heads allows the drive to access the different disk tracks.

The heads have an air bearing surface that cooperates with the air flow created by the rotating disks to generate an air bearing. The air bearing prevents mechanical contact between the head and disk surface to eliminate mechanical wear of the head transducers.

It has been found that contaminants such as dust particles will deposit onto the surfaces of the disks. The contaminants create asperities which may come into contact with the heads. This contact will create instabilities in the system. There have been developed filter systems to prevent contaminants from becoming deposited onto the disks. The filter systems are constructed to prevent deposition of contaminants. The filters are typically integrated into the housing of the disk drive. These systems do not actively remove contaminants already on the disks, or prevent deposition of contaminants in close proximity to the disk surfaces.

SUMMARY OF THE INVENTION

One embodiment of the present invention is a vortex generator that extends from an inner surface of a housing. The vortex generator cooperates with an air flow generated by a rotating disk of the disk drive to create vortices. The vortices can remove contaminants located on the surface of a disk.

DETAILED DESCRIPTION

Figure 1:
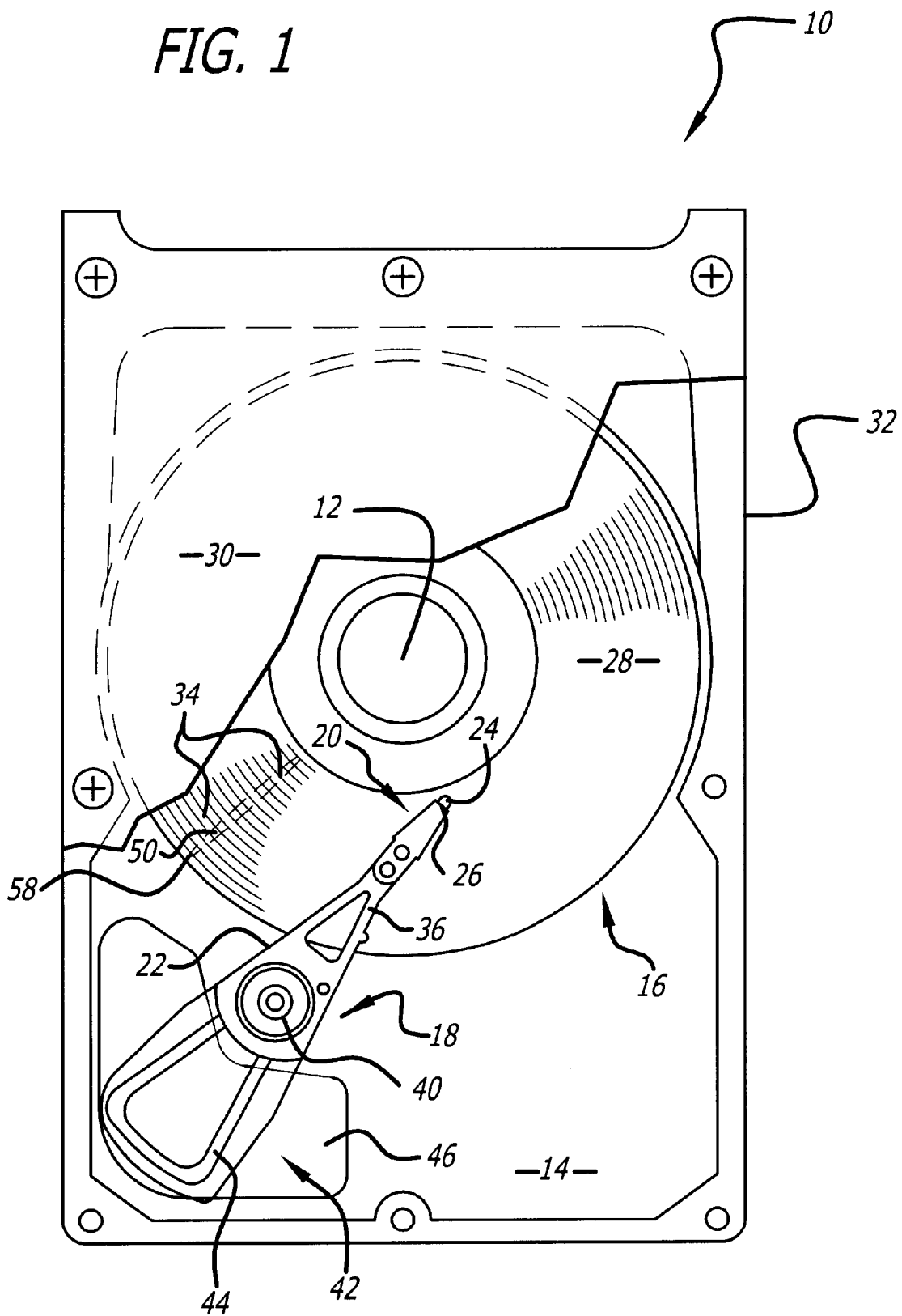
FIG. 1 is a top view of an embodiment of a hard disk drive of the present invention.
Figure 2:
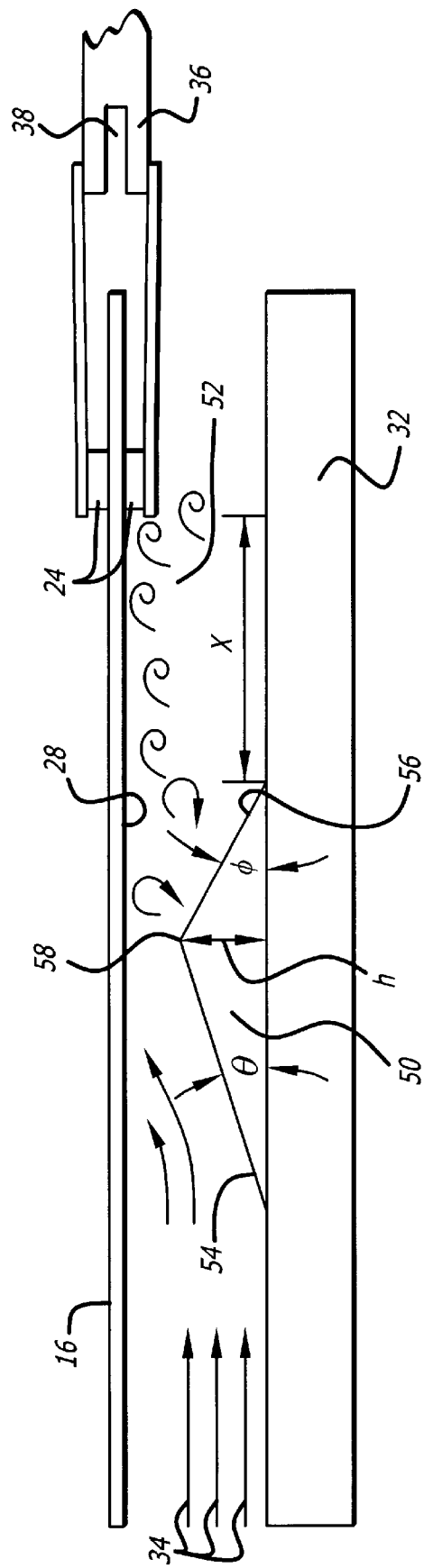
FIG. 2 is a side view of the hard disk drive with a vortex generator.

Referring to the drawings more particularly by reference numbers, FIGS. 1 and 2 show an embodiment of a hard disk drive 10 of the present invention. The disk drive 10 may include a spindle motor 12 that is mounted to a base plate 14. The spindle motor 12 rotates one or more disks 16. The disks 16 rotate relative to an actuator arm assembly 18. The actuator arm assembly 18 includes a plurality of head gimbal assemblies 20 that are attached to an actuator arm 22. Each head gimbal assembly 20 may include a head 24 that is gimbal mounted to a suspension arm 26. Each head 24 is magnetically coupled to a disk surface 28. The disks 16 and actuator arm assembly 18 may be enclosed by a cover plate 30 that is attached to the base plate 14. The cover 30 and base 14 plates form a disk drive housing 32. The disk drive 10 may also have a filter (not shown) to remove particles located within the drive.

Each head 24 may include a write element (not shown) and a read element (not shown) that are coupled to an electronic circuit(s) (not shown). The circuit and read/write elements can magnetize and sense the magnetic field of each disk surface 28 to store and retrieve data within the disk drive. The data is typically stored within sectors that extend along annular tracks of the disks 16. Each head 24 typically includes an air bearing surface which cooperates with an air flow 34 (see FIG. 2) created by the rotating disks 16 to create an air bearing between the head 24 and the disk surface 28. The air bearing prevents contact and wear between the disks 16 and the heads 24.

Referring to FIG. 1, the actuator arm 22 may include a plurality of individual actuator beams 36 that are separated by a slot 38 which allow the disks 16 to spin between the beams 36. The actuator arm 22 may be pivotally mounted to the base plate 14 by a bearing assembly 40 as shown in FIG. 1.

The actuator arm 22 may further have a voice coil portion 42 that supports a voice coil 44. The voice coil 44 may be coupled to a magnet assembly 46 and a driver circuit (not shown). When excited by the driver circuit the voice coil 44 cooperates with the magnet assembly 46 to create a torque that swings the actuator arm 22 relative to the base plate 14. The pivotal movement of the actuator arm 22 moves the heads 24 across the disk surfaces 28 to access different tracks of the disks 16.

As shown in FIG. 2, the housing 32 may have a vortex generator 50 that cooperates with the air flow 34 to create vortices 52. The vortices 52 create a turbulent air flow that may impinge upon the disk surface 28 and remove contaminants on the disk 16. The dislodged contaminants may then be removed by the filter system of the disk drive 10. Additionally, the vortices 52 may prevent contaminants from being deposited on the disk 16.

In one embodiment, the vortex generator 50 includes a first inclined surface 54 that is upstream of the air flow 34 and a second inclined surface 56 that is downstream from the flow of air. The second inclined surface 56 may intersect the first inclined surface 54 at a ridge 58. As shown more clearly in FIG. 1, the vortex generator 50 may extend along essentially the entire radius of the disk. It being desirable to generate vortices at least along the data portion of the disk 16.

It is desirable to design a vortex generator 50 with a height h, a first inclined angle $\theta$ and a second inclined angle $\phi$ for a generator located a distance x from the heads of the drive. By way of example, the first inclined angle may be approximately 30 degrees, the second inclined angle may be approximately 45 degrees and the height may be approximately 1.5 millimeters (mm) for distance x of approximately 40–55 mm. Such an arrangement will create vortices that flow adjacent to the surface of the disk.

The vortex generator 50 may extend from the base plate 14, the cover plate 30, or both plates 14 and 30. The generator 50 provides a passive means to remove and prevent contaminant deposition on the disk 16.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A housing for a hard disk drive, comprising:

a plate with an inner surface that has a vortex generator.

2. The housing of claim 1, wherein said vortex generator includes a first inclined surface.

3. The housing of claim 2, wherein said vortex generator includes a second inclined surface that intersects said first inclined surface.

4. The housing of claim 1, wherein said vortex generator includes a second inclined surface.

5. A disk assembly of a hard disk drive, comprising:

a disk;

a spindle motor that rotates said disk and creates a flow of air;

a head that is coupled to said disk;

an actuator arm that is attached to said head; and, a housing that is attached to said spindle motor and said actuator arm, said housing having a vortex generator that generates vortices in the air flow created by said rotating disk.

6. The disk assembly of claim 5, wherein said housing includes a base plate and said vortex generator extends from an inner surface of said base plate.

7. The disk assembly of claim 5, wherein said housing includes a cover plate and said vortex generator extends from an inner surface of said cover plate.

8. The disk assembly of claim 5, wherein said vortex generator includes a first inclined surface.

9. The disk assembly of claim 8, wherein said vortex generator includes a second inclined surface that intersects said first inclined surface.

10. The disk assembly of claim 5, wherein said vortex generator includes a second inclined surface.

11. A method for removing contaminants from a disk of a hard disk drive, comprising:

generating vortices adjacent to a surface of the disk to remove a contaminant on the disk.

12. The method of claim 11, wherein the vortices are created by an inclined surface that extends from an inner surface of a housing.

* * * * *